United States Patent
McGarry

(10) Patent No.: US 8,434,686 B2
(45) Date of Patent: May 7, 2013

(54) SWIPE SCANNER EMPLOYING A VISION SYSTEM

(75) Inventor: E. John McGarry, La Jolla, CA (US)

(73) Assignee: Cognex Corporation, Natick, MA (US)

( * ) Notice: Subject to any disclaimer, the term of this patent is extended or adjusted under 35 U.S.C. 154(b) by 12 days.

(21) Appl. No.: 12/987,527

(22) Filed: Jan. 10, 2011

(65) Prior Publication Data

US 2012/0018519 A1     Jan. 26, 2012

Related U.S. Application Data

(60) Provisional application No. 61/293,885, filed on Jan. 11, 2010.

(51) Int. Cl.
*G06K 7/10* (2006.01)

(52) U.S. Cl.
USPC ............ 235/462.11; 235/462.01; 235/462.39; 235/462.32

(58) Field of Classification Search ............. 235/462.11, 235/462.32, 462.01, 462.09, 383
See application file for complete search history.

(56) References Cited

U.S. PATENT DOCUMENTS

| | | | |
|---|---|---|---|
| 6,227,449 B1 | 5/2001 | Huang | |
| 6,290,135 B1 * | 9/2001 | Acosta et al. ............ | 235/472.01 |
| 6,360,947 B1 | 3/2002 | Knowles et al. | |
| 6,382,515 B1 | 5/2002 | Good et al. | |
| 6,517,004 B2 | 2/2003 | Good et al. | |
| 6,629,641 B2 | 10/2003 | Tsikos et al. | |
| 6,631,842 B1 | 10/2003 | Tsikos et al. | |
| 6,736,321 B2 | 5/2004 | Tsikos et al. | |
| 6,742,707 B1 | 6/2004 | Tsikos et al. | |
| 6,830,189 B2 | 12/2004 | Tsikos et al. | |
| 7,070,106 B2 | 7/2006 | Knowles et al. | |
| 7,128,266 B2 | 10/2006 | Zhu et al. | |
| 7,148,923 B2 | 12/2006 | Harper et al. | |
| 7,204,418 B2 | 4/2007 | Joseph et al. | |
| 7,250,976 B2 | 7/2007 | Huang et al. | |
| 7,296,744 B2 | 11/2007 | He et al. | |
| 7,303,132 B2 | 12/2007 | Knowles et al. | |

(Continued)

FOREIGN PATENT DOCUMENTS

| WO | WO 9949411 A1 | 9/1999 |
|---|---|---|
| WO | WO 0075856 A1 | 12/2000 |

*Primary Examiner* — Ahshik Kim
(74) *Attorney, Agent, or Firm* — Loginov & Assoc. PLLC

(57) ABSTRACT

This invention provides a point-of-sale scanning device that employs vision sensors and vision processing to decode symbology and matrices of information of objects, documents and other substrates as such objects are moved (swiped) through the field-of-view of the scanning device's window. The scanning device defines a form factor that conforms to that of a conventional laser-based point-of-sale scanning device using a housing having a plurality of mirrors, oriented generally at 45-degree angles with respect to the window's plane so as to fold the optical path, thereby allowing for an extended depth of field. The path is divided laterally so as to reach opposing lenses and image sensors, which face each other and are oriented along a lateral optical axis between sidewalls of the device. The sensors and lenses can be adapted to perform different parts of the overall vision system and/or code recognition process. The housing also provides illumination that fills the volume space. Illustratively, illumination is provided adjacent to the window in a ring having two rows for intermediate and long-range illumination of objects. Illumination of objects at or near the scanning window is provided by illuminators positioned along the sidewalls in a series of rows, these rows directed to avoid flooding the optical path.

16 Claims, 7 Drawing Sheets

U.S. PATENT DOCUMENTS

| | | |
|---|---|---|
| 7,357,325 B2 | 4/2008 | Zhu et al. |
| 7,464,877 B2 | 12/2008 | Kotlarsky et al. |
| 7,484,666 B2 | 2/2009 | Kotlarsky et al. |
| 7,487,917 B2 | 2/2009 | Kotlarsky et al. |
| 7,490,774 B2 | 2/2009 | Zhu et al. |
| 7,494,063 B2 | 2/2009 | Kotlarsky et al. |
| 7,527,200 B2 | 5/2009 | Tsikos et al. |
| 7,540,424 B2 | 6/2009 | Knowles et al. |
| 7,540,425 B2 | 6/2009 | Kotlarsky et al. |
| 7,543,752 B2 | 6/2009 | Kotlarsky et al. |
| 7,546,951 B2 | 6/2009 | Kotlarsky |
| 7,559,475 B2 | 7/2009 | Kotlarsky et al. |
| 7,575,167 B2 | 8/2009 | Kotlarsky et al. |
| 7,581,681 B2 | 9/2009 | Tsikos et al. |
| 7,594,609 B2 | 9/2009 | Kotlarsky et al. |
| 7,607,581 B2 | 10/2009 | Kotlarsky et al. |
| 7,780,087 B2 * | 8/2010 | Bobba et al. ............. 235/462.39 |
| 2006/0118627 A1 | 6/2006 | Joseph et al. |
| 2008/0023560 A1 | 1/2008 | He et al. |
| 2009/0001166 A1 | 1/2009 | Barkan et al. |
| 2009/0168117 A1 | 7/2009 | Kearney |

\* cited by examiner

SWIPE SCANNER EMPLOYING A VISION SYSTEM

RELATED APPLICATION

This application claims the benefit of U.S. Provisional Application Ser. No. 61/293,885, filed Jan. 11, 2010, entitled SWIPE SCANNER EMPLOYING A VISION SYSTEM, the entire disclosure of which is herein incorporated by reference.

FIELD OF THE INVENTION

This invention relates to point of sale scanning devices, and more particularly to fixed swipe-scanning devices.

BACKGROUND OF THE INVENTION

The use of scanning devices is ubiquitous in retail sales environments. A common implementation of scanning is in so-called point-of-sale applications in which a clerk or retail customer passes a purchased item through a fixed base scanner. A symbology, typically consisting of a one-dimensional (1D) bar code is exposed to the scanner as the object as passed or "swiped" through the operational field of the scanning device. The current industry standard in point-of-sale scanning technology employs a moving laser beam that passes in a pattern over the object containing the code. The pattern is rapidly driven by a motorized mirror in optical communication with the laser beam source. A receiver within the scanning assembly searches for barcode-like results returned by the reflection of the laser off the object.

Currently available, laser-based point-of-sale scanners are relatively inexpensive, reliable and durable. They are often arranged in a bioptic configuration, in which the reflected beam is transmitted and received from two ports, at a right angle to one another, improving the chances of a successful code-reading. However, these scanners are limited to the reading of 1D barcodes and equivalent 1D arrangements of information. They also have limited or no ability to record background information or image data regarding the swiped object.

It is desirable to provide a point-of-sale scanner arrangement that can fit within the form factor of existing bioptic, laser-based swipe scanners, but that allows for reading of 2D barcodes and other symbology that are not readable using a laser-based system. Such scanning arrangements should desirably allow for an object to be swiped at a variety of orientations and motion speeds, and within a predetermined distance from the scanner's window surface. It is further desirable that such a point-of-sale scanning arrangement potentially allow for reading of other types of data matrices, such as printed forms. Such scanning arrangements can also desirably acquire and store images of the swiped object and/ or information with respect to the swiped object.

SUMMARY OF THE INVENTION

This invention overcomes disadvantages of the prior art by providing a point-of-sale scanning device that employs vision sensors and vision processing to decode symbology and matrices of information of objects, documents and other substrates as such objects are moved (swiped) through the field-of-view of the scanning device's window. The scanning device defines a form factor that conforms to that of a conventional laser-based point-of-sale scanning device using a housing having a plurality of mirrors, oriented generally at 45-degree angles with respect to the window's plane so as to fold the optical path, thereby allowing for an extended depth of field. The path is divided laterally so as to reach opposing lenses and image sensors, which face each other and are oriented along a lateral optical axis between sidewalls of the device. A V-shaped mirror arrangement allows the optical path to extend to each lens. The sensors and lenses can be adapted to perform different parts of the overall vision system and/or code recognition process. Illustratively, each lens and sensor can operate of a discrete field-of-view within the overall scanner volume space, thereby allowing for increased resolution and more-rapid code recognition throughout the desired scanning volume space. The housing also provides illumination that fills the volume space. Illustratively, illumination is provided adjacent to the window in a ring having two rows. One row directs a plurality of illumination elements (LEDs) approximately normal to the window surface. This allows for long-range illumination. A second row is inwardly directed at an angle, allowing for intermediate range illumination. Illumination of objects at or near the scanning window is provided by illuminators positioned along the sidewalls in a series of rows, these rows directed to avoid flooding the optical path. Each respective side includes a first grouping of illumination elements (LEDs) that is directed at the main angled mirror facing the window at a rearward 45-degree angle. A second grouping of illumination elements is located forwardly of the first grouping and directed upwardly at a 45-degree angle to project directly through the window. The sensors are located forward of the second grouping at a position between the top surface forward of the window.

In an embodiment, at least one of the scanning device's image sensors is operatively connected with a Vision System on a Chip (VSoC) architecture that obtains feature information from images acquired by the sensor. This feature information can define symbology (e.g. 1D or 2D barcode) information or another form of scannable information (e.g. scannable form information).

In another embodiment, the point-of-sale scanning device can define a pair of units, oriented at a non-parallel (typically approximately 90-degree) angle in the manner of a bioptic scanner. This device includes a housing assembly having a first plurality of mirrors oriented to fold a first optical path, including a first main mirror positioned at an angle with respect to a first scanning window having a first scanning volume space defined thereabove. The first optical path illustratively directs light from the first scanning window into at least two discrete image sensors. A first illumination assembly is provided, which includes illumination elements located adjacent to the first scanning window to illuminate an intermediate to long range within the first scanning volume space and illumination elements located within the first housing adjacent to sidewalls thereof to illuminate objects at or near the first scanning window. The housing assembly further includes a second plurality of mirrors oriented to fold a second optical path, including a second main mirror positioned at an angle with respect to a second scanning window having a second scanning volume space defined thereabove. This second optical path directs light from the second scanning window into at least one discrete image sensor. A second illumination assembly provides illumination elements located adjacent to the second scanning window to illuminate an intermediate to long range within the second scanning volume space and illumination elements located within the second housing adjacent to sidewalls thereof to illuminate objects at or near the second scanning window. To provide the bioptic configuration, the first optical path and the second optical path cross each other at a non-parallel angle

BRIEF DESCRIPTION OF THE DRAWINGS

The invention description below refers to the accompanying drawings, of which.

DETAILED DESCRIPTION

Figure 1:
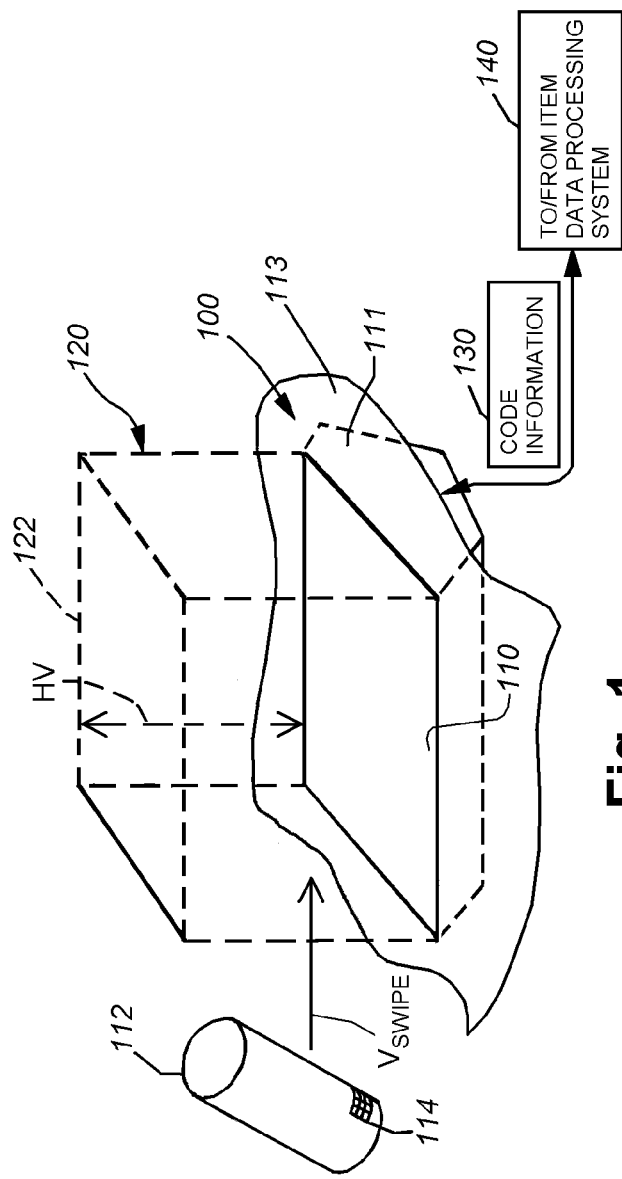
FIG. 1 is a perspective diagram of a swipe scanning system in operation employing a vision system according to an illustrative embodiment.

FIG. 1 illustrates a swipe scanning system 100 used in a point-of-sale environment, in which a scanning window 110 is located to image an exemplary object 112, as the object is passed (swiped) through the field-of-view of the system. The system comprises at least one scanning device, which is mounted within a supporting surface 113. As described further below, a second device can be mounted at a right angle with respect to the surface so as to provide the equivalent arrangement as that employed in a bioptic laser-based scanning system. In this example, the object 112 includes a one-dimensional (1D) or two-dimensional (2D) barcode or another symbology 114. The object is moved, typically by the hand of a sales clerk or a retail customer (in a self-service mode) through the volume space (dashed box 120) above the scanning window 110 at an approximate velocity Vswipe that is generally no greater than the average motion of a human arm in conducting such a task. For the purposes of this description, one can assume that the maximum Vswipe is approximately 1 msec. The volume space extends a height HV from the surface of the transparent scanning window (also informally termed a "scanner glass" that is generally flush with the surrounding surface 113) to an upper end 122 that, for the purposes of this example is approximately 120 mm. The overall volume space 120 defines an approximate cube 120 mm on each side. It is desirable that a code be readable by the system as the code-bearing portion of the object passes through this space at any height thereof. Thus, the code can move through the volume space on a movement path that is (i) at, or close to, the window 110, (ii) near the top 122, (iii) at another intermediate location—or along a path that varies in height with respect to the window 110. To facilitate convenient and effective use of the scanner, the barcode should be readable regardless of the movement path it takes through the space. This generally presents a challenge because the height at which the code passes can vary, as can the speed and angle of the code with respect to the scanner's optical axis.

Briefly, as described further below, the window 110 allows for illumination to pass onto the object 112. The optics within the device 100 return reflected light to a plurality of image sensors that are operatively connected with vision system processors. The processor receives a plurality of sequential acquired images of the object and attempt to identify the barcode 114 and resolve its features. An appropriate hardware and/or software function interprets the features into corresponding barcode information 130 (for example, alphanumeric SKU information), which can be transmitted to data processing system 140 that uses the information in sales, inventory and other conventional operations.

Figure 2:
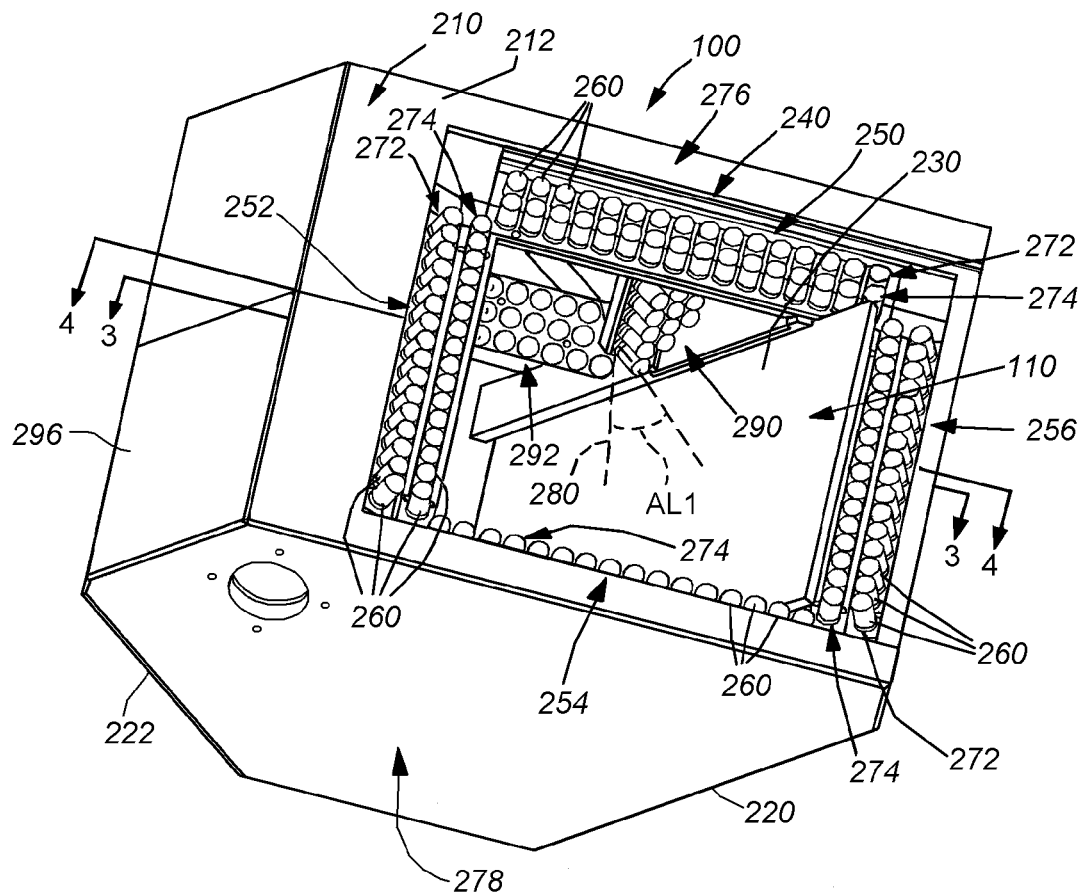
FIG. 2 is a top perspective view of a swipe scanning device showing a portion of the internal illumination and mirror structure in accordance with an illustrative embodiment.

Reference is now made to FIG. 2, which shows the scanning device 100 in further detail. In the illustrative embodiment the device is enclosed in a housing 210 that defines the depicted multi-planar shape. This shape is exemplary of a variety of possible housing options and mounting assemblies. The housing includes a partially open top face 212 holds the transparent scanning window 110, which is typically a transparent plate to seal the interior of the device and establish the minimum scanning distance (i.e. placing the object against the plate). The housing also includes a pair of opposing base sides 220 and 222 that support opposing mirrors at respective 45-degree angles relative to the plane of the top face 212. As described further below, this geometry enables the folding of the optical path of light received from the object through the window 110. The first 45-degree mirror 222 is visible through the window 110 as shown.

Figure 3:
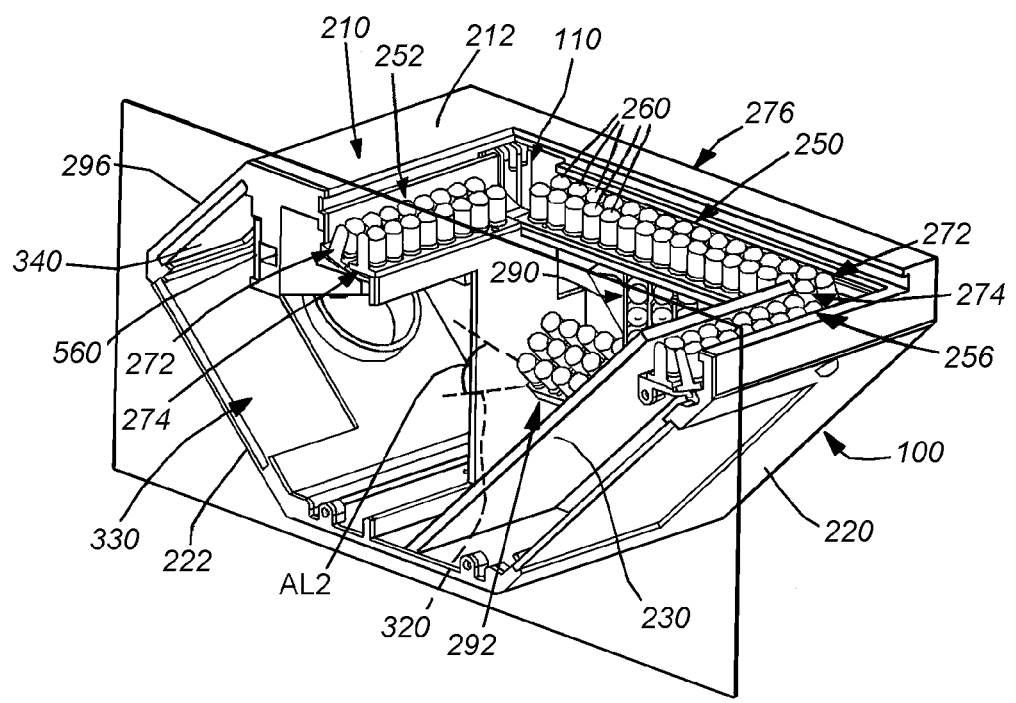
FIG. 3 is a side cross section taken along line 3-3 of FIG. 2, showing the internal structure of the swipe scanning device in perspective view.
Figure 4:
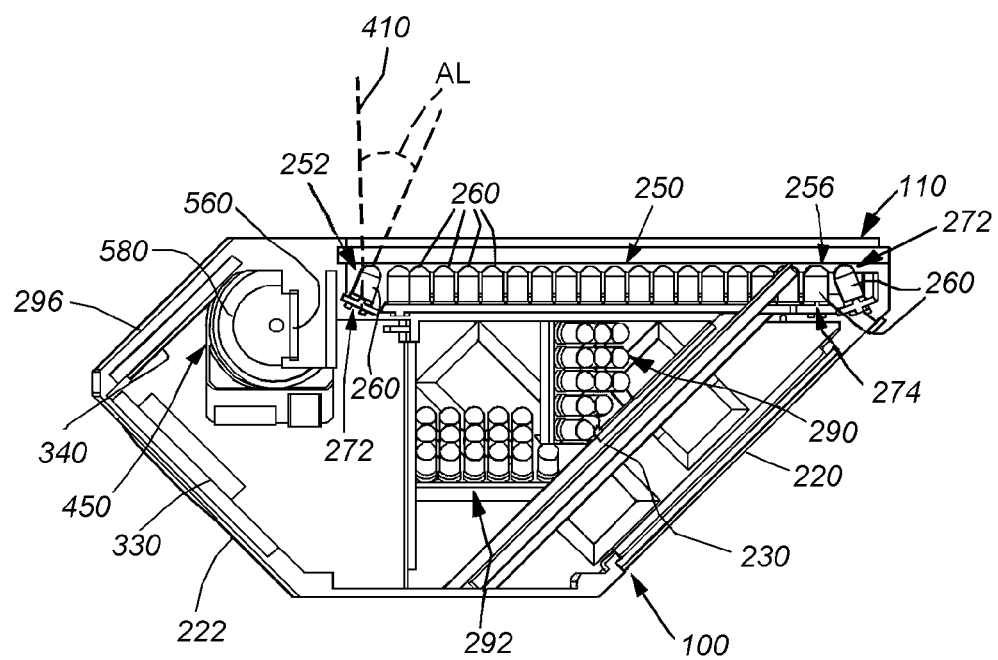
FIG. 4 is a side cross section taken along line 4-4 of FIG. 2, showing the internal structure of the swipe scanning device, and in particular showing the arrangement of the optical-path-folding mirror arrangement in association with one of the two image sensor assemblies, the opposing side being a mirror image of the depicted side with like elements.

In order to provide adequate illumination of the volume space (120 in FIG. 1) above the window 110, the device provides a multiplicity of high-output, "Ultra-Bright" white, 5 mm LEDs, arranged in banks using underlying circuit boards. Further reverence will also be made to the cross sections in FIGS. 3 and 4 to describe the placement of illuminating LEDs. In an embodiment each of the LEDs can be a 15-degree-angle illumination device, but illumination devices defining other output angles, such as 30-degrees, are contemplated in alternate implementations. Likewise, the output color, size, number and output level of discrete LEDs used herein can be varied in alternate implementations.

The edge 240 of the window 110 is surrounded by exposed banks 250, 252, 254, 256 of LEDs 260 located to the inside face of the window. In this embodiment, each bank includes two parallel rows 272 and 274 each having 16 discrete LEDs arranged in close proximity. The row 272 closest to the edge 240 includes LEDs oriented at an inward angle AL (FIG. 4) of approximately 20 degrees with respect to the normal to the window's surface plane (dashed line 410). The row 274 further from the window edge 240 are oriented generally normal to the window surface plane. The edge-positioned LED rows allow the area of the volume space that is spaced away from the window to be sufficiently illuminated for adequate acquisition of symbols in a variety of orientations. The normal row illuminates the space near the top of the range and the angled rows illuminate the intermediate distances. It should be clear that the depicted arrangement of discrete illuminators can be varied in a number of ways to achieve the desired illumination pattern at a distance from the window 110.

To illuminate the region at or relatively near the window 110, to banks of illuminators are provided on respective circuit boards on each of the opposing lateral sides (sidewalls 276, 278) of the device housing. As shown, one bank 290 of 12 LEDs are arranged in a polygonal packing shape on a board that is directed at a 45 degree angle AL1 with respect to a transverse line 280 extending across the housing. These LEDs direct a spot of light at the mirror 230, which in turn reflects the light upwardly through the window 110 at a closely positioned object. As one can discern from the geometry, the angle and placement of the bank 290 prevents light from the bank from being reflected directly back into the optical path by the mirror 230. To fill the local region near the window, a second bank 292 is provided on each lateral side of the device housing in a location forward (toward the wall 222) of the bank 290. Each bank 292 also comprises 16 closely packed LEDs, arranged in three rows. In this illustrative arrangement, the lowest row includes an extra LED where it is unobstructed by the bank 290. The bank is angled upwardly at an angle AL2 (FIG. 3) toward the window 110. The ankle AL2 is 45 degrees with respect to a line 320 running parallel to the window surface (the line 320 also running laterally transverse across the housing between sidewalls 276, 278).

Figure 5:
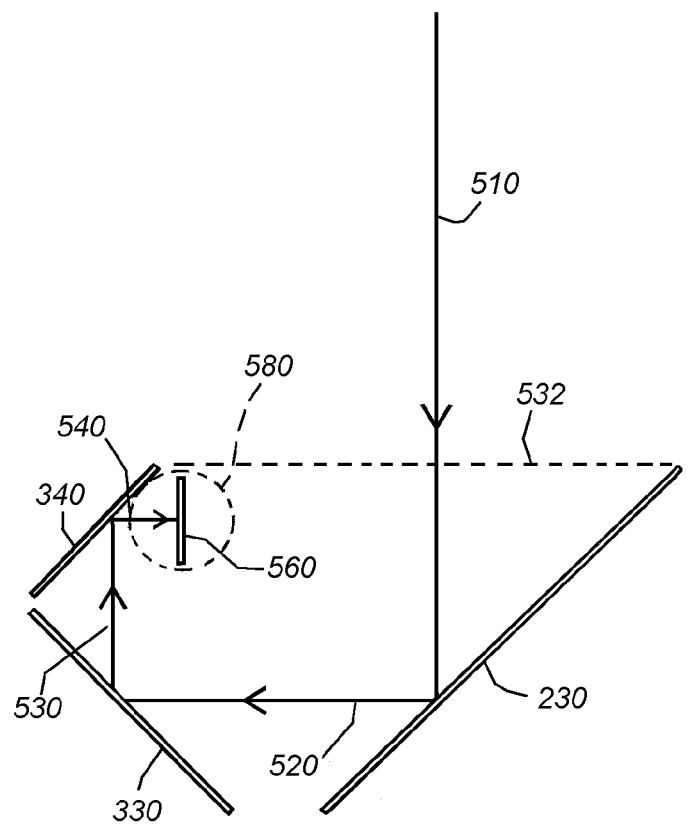
FIG. 5 is a schematic side view of the mirror arrangement and associated optical path for the scanning device as presented in FIG. 4.

The described illumination arrangement thereby allows both proximate and spaced-apart regions of the volume space to be adequately illuminated without flooding the optical path itself with light, which could degrade the operation of the image sensors. The folding of the optical path by use of mirrors within the housing is now described in further detail with additional reference to the schematic diagram of FIG. 5.

Figure 5A:
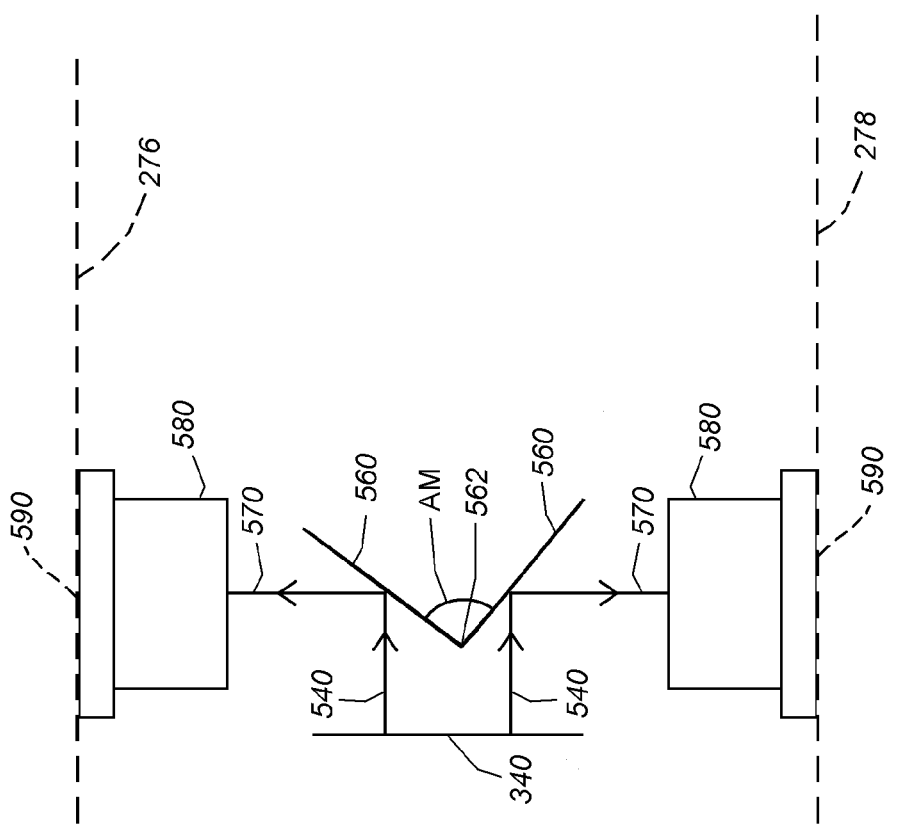
FIG. 5A is a partial schematic top view of the mirror arrangement and associated optical path of FIG. 5 showing the positioning of the image sensors and lenses and the associated redirecting mirror assembly.

In general, the provision of a longer optical path allows for a greater depth of field (DOF), thereby increasing the ability of the system to resolve images at variable range within the volume space. As described above, the light from an illuminated object within the volume space travels along the path 510 (FIG. 5) to the large 45-degree mirror 230 beneath the window 110. The light is then reflected onto a path section 520 to a second 45-degree angle mirror 330 supported by wall 222. The light is reflected again upwardly in a direction normal to the plane (532) of the window surface toward a third 45-degree angle mirror 340 supported by an upper end wall 296 (see FIGS. 2-4). This mirror directs the light along a path segment 540 that extends rearwardly, toward wall 230. With reference also to FIG. 5A, the path is redirected laterally toward the opposing side walls following segment 540 by a pair of oppositely angled mirrors 560 that converge at a central, vertical (normal to the window surface) corner 562 and generally define a V-shape. The corner defines an angle AM of approximately 90 degrees. The redirected path segments 570 thereafter reach a respective lens 580 that is in optical communication with a respective vision system image sensor 590. The lenses are located with their optical axes extending transversely between the sidewalls 276, 278 in a space 450 (FIG. 4) beneath the top face 212 in the area just forward of the window 110. In this manner the light reflected from the object is received simultaneously by two discrete sensors positioned in a low-profile housing that allows for a relatively long optical path for improved DOF.

In an illustrative embodiment, the working distance of the receptive volume extends from approximately 120 mm to 240 mm, which translates to a viewing angle that is approximately 20 degrees (included angle) to achieve the desired field-of-view. In the illustrative embodiment, each of the two lenses 580 can provide a discrete field-of-view within the overall height of the volume space. That is, one lens provides a field-of-view within the lower region and one provides a field-of-view within the upper region, respectively. By way of example each lens can be a 25 mm F#8 M12.

The structure and function of image sensors 590 are highly variable. In an illustrative embodiment, they can comprise an integrated vision system processor that affords a Vision System on a Chip (VSoC). Such an implementation includes the processing hardware and software to allow barcode recognition and generation of feature results. The decoding functions can be provided on the same chip or in a different package that is operatively connected with each vision processor. In alternate implementations, the vision processor(s) can be provided on separate structures that are interconnected with each image sensor. Other arrangements of image sensors and processors can also be employed in further alternate embodiments. By way of useful background information a VSoC architecture is shown and described in commonly assigned U.S. Published Patent Application No. US 2009/0141987 A1, entitled VISION SENSORS, SYSTEMS, AND METHODS, by E. John McGarry, et. al, the teachings of which are incorporated herein by reference.

In operation, the vision processors cause the illumination banks to strobe at a predetermined frequency. This is synchronized with the acquisition of image frames. By way of example, a frame acquired each microsecond can provide a sufficient quantity of image data to allow a barcode to be recognized and decoded at the contemplated swipe velocity. A higher or lower frequency can be used in alternate embodiments. Notably, each image sensor provides image data to the vision system process. The process can use the best data, and combine various frames to find the code and derive the feature information. Thus, as an object moves through the swipe scan, images containing at least recognizable portions code features are found, the features are used collectively to build a readable code by the vision process.

Figure 6:
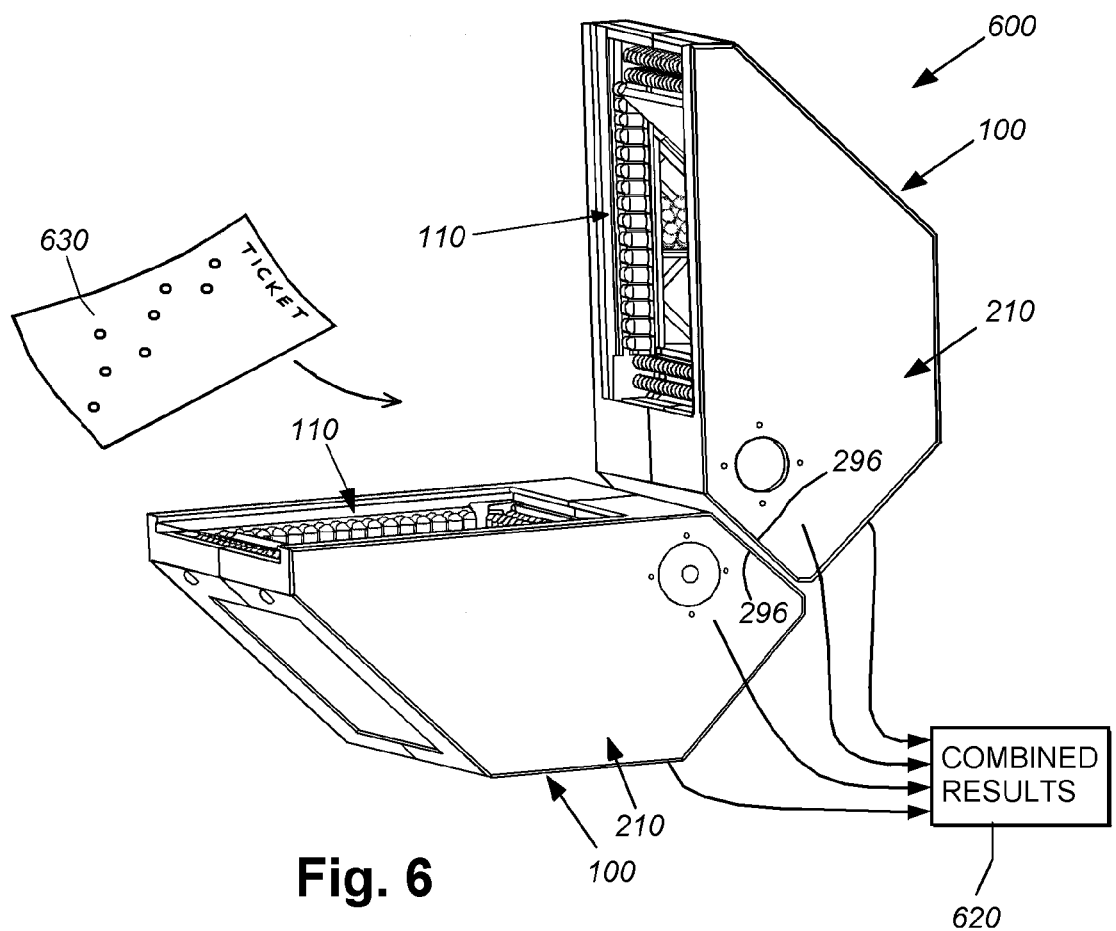
FIG. 6 is a perspective view of an arrangement of two swipe scanning devices in accordance with an illustrative embodiment, oriented with respect to each other at a right angle.

As detailed in FIG. 6, an implementation of the scanning system 600 can provide a similar scanning arrangement to that of a convention laser-based bioptic scanner be employing two similar scanning devices 100 in a right angle arrangement as shown. Illustratively, the optical paths of the two units, where they pass through their respective scanning windows, cross at approximately 90 degrees. Other crossing angles are expressly contemplated in other embodiments. In this arrangement, the 45-degree corners 296 of each housing 210 are conveniently placed into a face-to-face relationship, with the sensor pairs adjacent to each other and each window 110 extending toward opposing edges of the arrangement. Thus the housing geometry of each unit makes for ease of grouping in a right-angle arrangement as shown. The surrounding structure and mounting arrangements employed for the two units are highly variable, but can be similar to those used to support a conventional laser-based bioptic scanner implementation. In this manner, each object is scanned by a horizontal and a vertical scanning window simultaneously. The scanning volume space for each window can be approximately the same. If a code is swiped at an oblique angle with respect to one or both of the window surfaces, the ability to capture images from both orientations provides further data that can be combined (process block 620) to generate a recognized set of symbology code features. In this example each for the four sensors in each devices sensor pair provides image data to the vision process. It should be clear that a wide variety of vision system processes can be employed to extract the needed code features from the images of one or more sensors. The arrangement of processors to perform the vision system processes is also highly variable. The task can be localized in one processor or distributed through a multiplicity of vision system processors associated with each of the various image sensors. Likewise, the timing of triggers and illumination strobes can be alternated or staggered for each discrete device in the right-angle arrangement. In this manner, the illumination in one direction does not interfere with the illumination in the other, right-angle direction. That is, the triggers and strobes with respect to each direction are constructed and arranged to operate at different times so as to be free of interference with each other. Also, in alternate embodiments, the vertically oriented scanning device can include only a single sensor—for example directed at an intermediate range. While each scanning unit in the right-angle arrangement can be provided in a separate housing, in an alternate embodiment, these housings can be subhousings in an overall housing assembly. Alternatively, a single overall housing that supports the optics, illumination and sensors/processors of each unit can be employed. The term "housing" or "housing assembly" should be taken broadly to include all possible mounting and enclosure arrangements.

While the reading of barcodes and symbologies is described in accordance with the embodiments herein, it is expressly contemplated that other types of objects and forms, particularly those containing structured matrices of information can be swipe scanned in accordance with the principles of the illustrative embodiments. By way of example, a computer scored form 630 is shown being scanned. This form includes a series of penciled-in data selections, chosen by the user from a row of possible selections (i.e. an "NCR"-type form). The position of each data selection on the form is read by the system and decoded.

It should be clear that the use of a device having an extended optical path due to folding and effective illumination over a range of distances from the scanning window allows for the effective use of image sensors in a POS scanning environment. The use of at least two sensors to divide the scan objects at two discrete distance ranges with respect to the window further enhances the effectiveness and speed of the scanning process by allowing for higher resolution at each discrete distance, and avoiding the drawbacks inherent with a single wide-range optic. The use of two or more discrete sensors can have other advantages in dividing the machine vision task as well. The use of folding and illumination as described further allows for a compact design that conforms to the form factor of existing bioptic scanners.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the use of terms, such as "vertical," "horizontal," "forward," "rearward," "front," "back," "side," and the like, is meant as a convention and to described relative orientations within the device and not to define absolute directions. Also, as used herein the term "each" shall not be taken as limiting the number of a particular element in an arrangement, but rather to aid the reader in defining relative (respective) association of such components with respect to other components in the arrangement. Moreover, the construction of the housing, while provided a pair of clamshell halves in this embodiment, can be constructed in other ways in alternate embodiments. Likewise the exterior appearance of the housing is highly variable, and it can include a variety of mounting brackets, frame pieces and other structures that facilitate mounting in a point of sale counter or kiosk. The materials used to construct the various components herein can be polymers, metals, or a combination of such materials. Likewise, while LEDs are used as discrete illumination elements in the various illumination groupings/arrays in the illustrative embodiments, other forms of lighting sources can be employed in alternate embodiments. For example, central light sources with fiber-optic waveguides can be used in alternate embodiments. Also, while the mirrors shown herein are generally oriented at 45-degree angles to provide the folded optical path, it is expressly contemplated that a plurality of mirrors can be provided at appropriate non-45-degree angles to achieve a similar folding effect. Moreover, while the image sensors herein are generally defined as a 2-dimensional CMOS (or CCD) array of imaging pixels that generate a color or grayscale image, it is expressly contemplated that other imaging arrangements can be employed in alternate embodiments. Also, while not shown individually, the processor arrangement can include, or be operatively connected to a hardware and/or software-based symbology (e.g. barcode) decoding mechanism that resolves symbology (barcode) features into data for use by another device, such as a cash register, inventory-tracking system, etc. More generally, any of the processes and procedures described herein can be implemented in hardware, software that includes a recorded or non-transitory computer-readable medium of program instructions, or a combination of hardware and software. Accordingly, this description is meant to be taken only by way of example, and not to otherwise limit the scope of this invention.

What is claimed is:

1. A point-of-sale scanning device comprising:
  a housing having a plurality of mirrors oriented to fold an optical path that directs light from a scanning window to at least two image sensors, the plurality of mirrors including a main mirror positioned at an angle with respect to the scanning window having a scanning volume space defined thereabove, a pair of mirrors positioned to direct the optical path from the main mirror to a V-shaped mirror, the V-shaped mirror having a vertically oriented corner having the pair of mirrors and directing the optical path laterally toward each of the at least two image sensors, the image sensors facing each other and having a laterally aligned optical axis; and
  an illumination assembly, including illumination elements located adjacent to the scanning window to illuminate an intermediate to long range within the scanning volume space and illumination elements located within the housing adjacent to sidewalls thereof to illuminate objects at or near the scanning window.

2. The scanning device as set forth in claim 1 wherein the at least two discrete image sensors respectively perform recognition of features on objects located at respective of a plurality of ranges with respect to the scanning window.

3. The scanning device as set forth in claim 1 wherein the illumination assembly includes a ring of illumination elements located around an edge of the scanning window adjacent thereto and groupings of illumination elements that are directed at an angle upwardly toward the scanning window and at an angle rearwardly into the main mirror.

4. The scanning device as set forth in claim 1 wherein the pair of mirrors are positioned at an angle of 45-degrees with respect to each other.

5. The scanning device as set forth in claim 1 wherein at least one of the image sensors is operatively connected with a Vision System on a Chip (VSoC) that obtains feature information from images acquired by the sensor.

6. The scanning device as set forth in claim 5 wherein the symbology feature information includes at least one of (a) one-dimensional barcode information and (b) two-dimensional barcode information.

7. The scanning device as set forth in claim 5 wherein the feature information includes computer-scored form information.

8. The scanning device as set forth in claim 1 at least one of the image sensors acquires feature information that includes at least one of (a) one-dimensional barcode information and (b) two-dimensional barcode information.

9. A point-of-sale scanning device comprising:
- a housing assembly having a first plurality of mirrors oriented to fold a first optical path, including a first main mirror positioned at an angle with respect to a first scanning window having a first scanning volume space defined thereabove, the first optical path directing light from the first scanning window into at least two discrete image sensors;
- a first illumination assembly, including illumination elements located adjacent to the first scanning window to illuminate an intermediate to long range within the first scanning volume space and illumination elements located within the first housing adjacent to sidewalls thereof to illuminate objects at or near the first scanning window;
- the housing assembly further having a second plurality of mirrors oriented to fold a second optical path, including a second main mirror positioned at an angle with respect to a second scanning window having a second scanning volume space defined thereabove, the second optical path directing light from the second scanning window into at least one discrete image sensor; and
- a second illumination assembly, including illumination elements located adjacent to the second scanning window to illuminate an intermediate to long range within the second scanning volume space and illumination elements located within the second housing adjacent to sidewalls thereof to illuminate objects at or near the second scanning window,
- wherein the first optical path and the second optical path cross each other at a non-parallel angle.

10. The scanning device as set forth in claim 9 wherein the second optical path directs light from the window into at least two discrete image sensors.

11. The scanning device as set forth in claim 9 wherein the non-parallel angle is approximately a right angle.

12. The scanning device as set forth in claim 9 therein the at least two sensors receiving light from the first optical path and the at least one sensor receiving light from the second optical path provide feature information that is combined to decode a symbology.

13. The scanning device as set forth in claim 12 further comprising at least one processor constructed and arranged to operate the at least two sensors receiving light from the first optical path and the at least one sensor receiving light from the second optical path, the first illumination assembly and the second illumination assembly at discrete timings so that acquisition of an image along the first optical path occurs free of interference with acquisition of an image along the second optical path.

14. The scanning device as set forth in claim 9 wherein the at least two discrete image sensors receiving light from the first optical path respectively perform recognition of features on objects located at respective of a plurality of ranges with respect to the scanning window.

15. The scanning device as set forth in claim 9 wherein at least one of the image sensors receiving light from at least one of the first optical path and the second optical path is operatively connected with a VsoC that obtains feature information from images acquired by the sensor.

16. The scanning device as set forth in claim 9 at least one of the image sensors receiving light from at least one of the first optical path and the second optical path acquires feature information that includes at least one of (a) one-dimensional barcode information and (b) two-dimensional barcode information.

\* \* \* \* \*